United States Patent [19]

Nakamura

[11] Patent Number: 5,044,643
[45] Date of Patent: Sep. 3, 1991

[54] TOOL CHUCK

[76] Inventor: Daijiro Nakamura, 662-2, Shimokishi-cho, Ono, Japan

[21] Appl. No.: 537,471

[22] Filed: Jun. 12, 1990

[30] Foreign Application Priority Data

Jun. 16, 1989 [JP] Japan ................................. 1-754900

[51] Int. Cl.$^5$ ............................................. B23B 31/12
[52] U.S. Cl. ..................................... 279/60; 279/1 K; 475/168
[58] Field of Search .................................. 279/60–62, 279/1 K; 475/168

[56] References Cited

U.S. PATENT DOCUMENTS

| | | | |
|---|---|---|---|
| 913,059 | 2/1909 | Savage | 279/62 |
| 1,159,248 | 11/1915 | Morrow | 279/60 |
| 1,473,488 | 11/1923 | McConnell | 279/62 |
| 2,042,197 | 5/1936 | Stoner | 279/61 |
| 3,807,745 | 4/1974 | Bent | 279/62 |
| 4,643,047 | 2/1987 | Distin et al. | 475/168 |
| 4,829,851 | 5/1989 | Imase | 475/168 |

Primary Examiner—Larry I. Schwartz
Assistant Examiner—Robert Schultz
Attorney, Agent, or Firm—Moonray Kojima

[57] ABSTRACT

A tool chuck according to this invention comprises a locking device disposed between a chuck body and chuck claws slidable by screw feeding. The locking device presses and locks to the chuck body by a reaction force occurring when the chuck claws clamp a tool. The tool chuck further comprises a torque amplifying device disposed between the locking device and a control ring rotatably mounted on the chuck body. When the locking device is locked to the chuck body, the torque amplifying device reduces rotation of the control ring to output an amplified torque to a screw ring which screw-feeds the chuck claws. The chuck claws are slidable fast until the chuck claws clamp a tool inserted in position to realize a quick clamping action. When the chuck claws contact and hold the tool, the chuck claws are slidable with an increased torque, thereby holding the tool with a strong clamping force.

12 Claims, 9 Drawing Sheets

TOOL CHUCK

BACKGROUND OF THE INVENTION

1. Field of Application

This invention relates to tool chucks for attachment to power drills, power drivers and the like, to hold tools such as drill bits and driver bits, and more particularly to the type of tool chuck that is manually tightened without using a chuck handle.

2. Description of the Prior Art

A conventional tool chuck of the type having a turn ring rotatable with a chuck handle to extend and retract chuck claws involves a cumbersome handle operation, maintenance of the chuck handle under care and other inconveniences. To eliminate such disadvantages, a tool chuck has already been developed which has a turn ring rotated manually without using a chuck handle to tighten the chuck claws, and a locking device for preventing the chuck claws from loosening during an operation.

With the tool chuck having such a locking device, however, the tool will rotate idly to the detriment of an effective operation if the chuck claws impart an insufficient clamping force.

In order to obtain a strong tightening force, it is conceivable to increase the torque by reducing the rotation of the turn ring through a suitable reduction mechanism. However, this would give rise to the problem that the chuck cannot be operated quickly since the chuck claws are caused to slide at a reduced speed even when an inserted tool is not clamped by the chuck claws.

OBJECTS OF THE INVENTION

A primary object of this invention is to provide a tool chuck comprising a locking device disposed between a chuck body and chuck jaws slidable by screw feeding, the locking device pressing and locking to the chuck body by a reaction force occurring when the chuck jaws clamp a tool, and a torque amplifying device disposed between the locking device and a control ring rotatably mounted on the chuck body, the torque amplifying device reducing rotation of the control ring (or nut) to output an amplified torque to a screw ring which screw-feeds the chuck jaws when the locking device is locked to the chuck body, whereby the chuck jaws are slidable fast until the chuck claws contact a tool inserted in position to realize a quick clamping action.

A secondary object of this invention is to provide a tool chuck wherein the rotation of the control ring is provided with an automatically increased torque when the chuck jaws contact and hold the tool, thereby causing the chuck jaws to slide with the increased torque for holding the tool with a strong clamping force.

Other objects of this invention will be apparent from the following description of the preferred embodiments.

BRIEF DESCRIPTION OF THE DRAWINGS

The drawings show embodiments of this invention, in which.

DETAILED DESCRIPTION OF THE PREFERRED EMBODIMENTS

First Embodiment

A first embodiment of this invention will be described in detail hereinafter with reference to the drawings.

Figure 1:
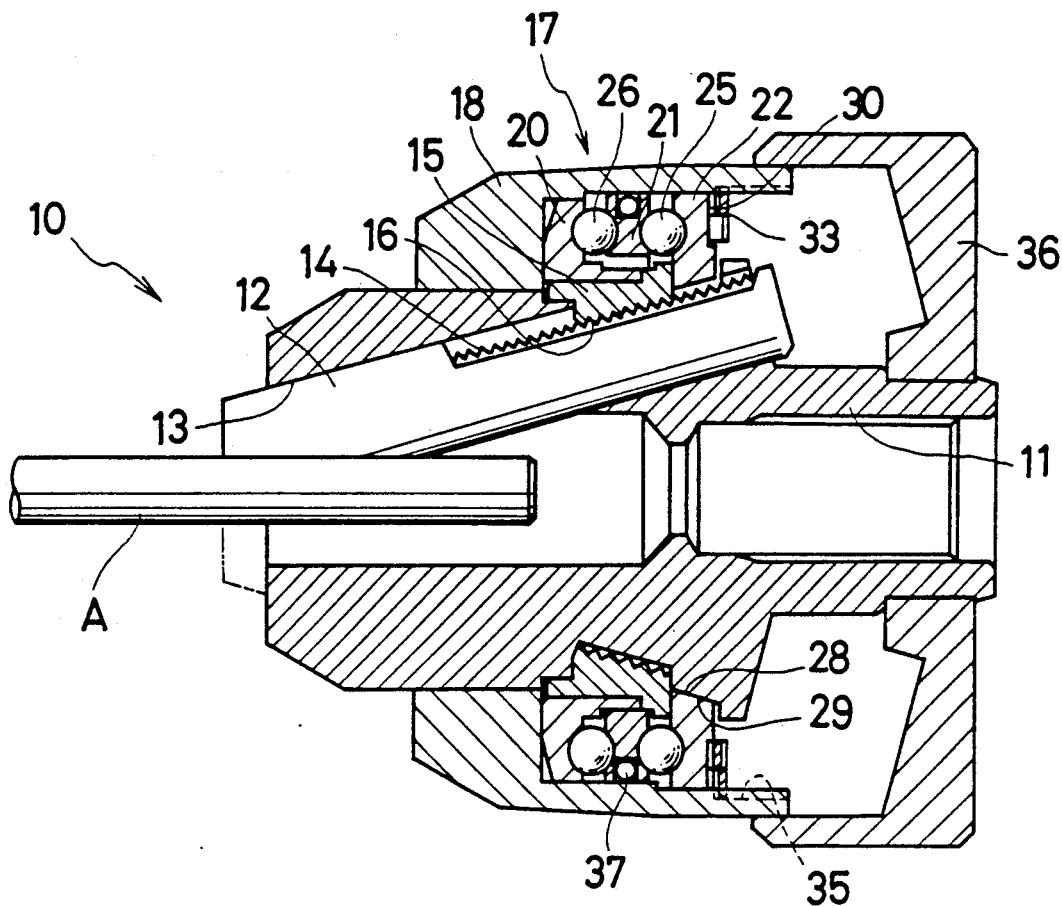
FIG. 1 is a view in vertical section of a tool chuck in a first embodiment.
Figure 3:
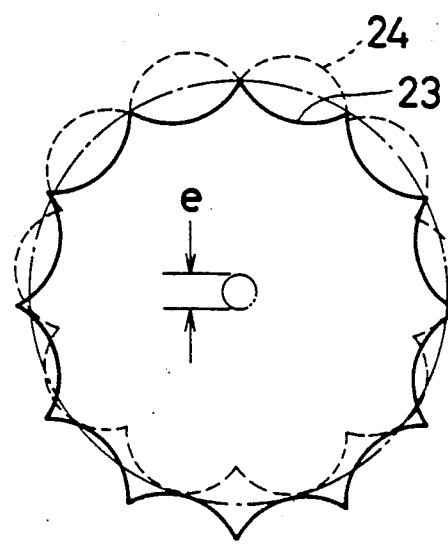
FIG. 3 is a schematic view illustrating rolling grooves.
Figure 2:
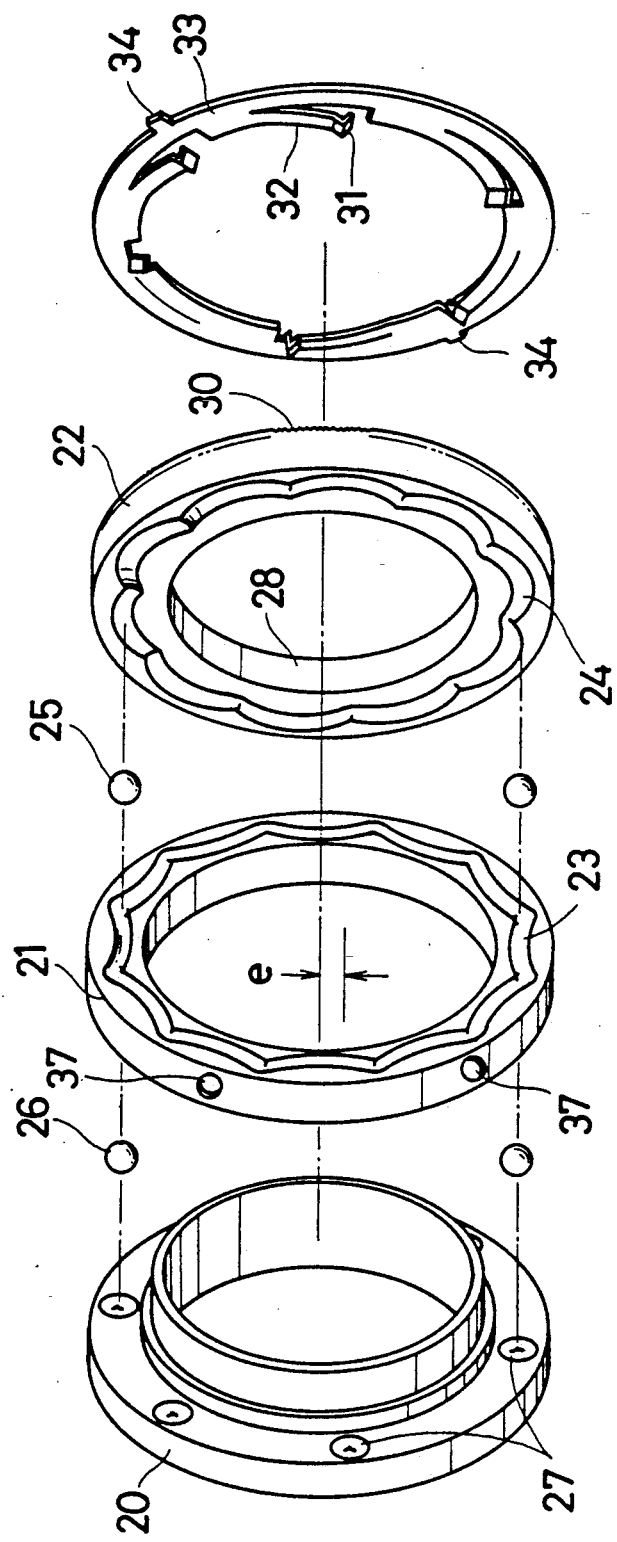
FIG. 2 is an exploded perspective view of a torque amplifying mechanism.

FIGS. 1 through 3 show a tool chuck in the first embodiment. This tool chuck is used with a power drill or a power driver for holding a tool such as a drill bit or a driver bit.

Referring to FIGS. 1 and 2, the tool chuck 10 comprises three chuck jaws 12 slidably mounted centrally of the forward end of a chuck body 11. The chuck jaws 12 are inclined with respective forward ends thereof converging toward the axis of the chuck body 11.

More particularly, the chuck jaws 12 are mounted only slidably in slide grooves 13 formed in the chuck body 11 as inclined relative to its axis, respectively. Each jaw 12 defines a partial male screw 14 on a peripheral position thereof, with threads of the screw arranged to constitute a continuous whole. The respective partial male screws 14 are meshed with a female screw 16 defined in a screw ring (or nut) 15. With turning of the screw ring 15 in opposite directions, the chuck jaws 12 are slidable toward and away from one another for clamping and releasing a tool.

A torque amplifying mechanism 17 is mounted peripherally of the screw ring 15, and a control ring 18 is mounted peripherally of the torque amplifying mechanism 17. When the control ring 18 is turned forward or backward, i.e. in a direction to clamp or release the tool A, the torque is transmitted to the screw ring 15 through the torque amplifying mechanism 17.

The torque amplifying mechanism 17 is constructed as follows.

The mechanism 17 includes three annular elements, i.e. an output ring 20 press fit in and fixed to the screw ring 15, an input ring 21 relatively rotatably supported in the control ring 18 and offset a predetermined amount of eccentricity e, and a locking ring 22 movable into pressure contact with a rearward position of the chuck body 11 through tapered peripheral surfaces. These annular elements are arranged axially of the chuck body 11.

The input ring 21 defines a hypocycloidal rolling groove 23 having an arcuate section on a surface thereof opposed to the locking ring 22. The locking ring 22 defines an epicycloidal rolling groove 24 having arcuate sections on a surface thereof opposed to the input ring 21. A plurality of balls 25 are arranged between these rolling grooves 23 and 24 to roll along the grooves 23 and 24.

As also shown in FIG. 3, the rolling grooves 23 and 24 have an amplitude corresponding to the amount of eccentricity e of the input ring 21. The input ring 21 has ten waves, and the locking ring 22 twelve waves. The number of balls 25 arranged therebetween is eleven or less.

Due to the amount of eccentricity e, the balls 25 roll along the rolling grooves 23 and 24 to allow rotation of the input ring 21, through action of balls in holes 37 being rotatable by rotation of the control ring 18. Since the rotation is significantly reduced with respect to the revolution of the control ring, the rotation of the input ring 21 results in output of an amplified torque.

Since, in this embodiment, the rolling groove 23 of the input ring 21 has 10 waves and the rolling groove 24 of the locking ring 22 has 12, the difference in the number of waves being 2, the reduction ratio is 2/10 waves = 1/5.

A greater reduction ratio may be obtained by increasing the numbers of waves. Where, for example, the input ring 21 has 40 waves and the difference in the number of waves is 2, 2/40 waves = 1/20, to output a greatly amplified torque.

To transmit the rotation of the input ring 21 to the output ring 20, a plurality of balls 26 are arranged between opposed surfaces thereof.

More particularly, the input ring 21 defines recesses (not shown) for receiving the balls 26, while the output ring 20 defines recesses 27 opposed thereto. The recesses 27 of the output ring 20 have a size (ring-shaped) for allowing the balls 26 to move round by the same amount of eccentricity e, so that power transmission is possible despite the eccentric turning of the input ring 21.

For fixing the locking ring 22 to the chuck body 11, the locking ring 22 defines, centrally thereof, a tapered pressure contact surface 28 diverging rearwardly, while the chuck body 11 defines a pressure contact surface 29 corresponding thereto. These surfaces move into pressure contact with each other when the locking ring 22 is pushed by a backlash of the screw ring 15 (with retraction of the chuck claws 12), whereby the locking ring 22 is fixed to the chuck body 11.

The locking ring 22 defines teeth 30 on the circular rear end thereof. An elastic ring 33 is disposed on the rear end of the locking ring 22, the elastic ring 33 defining a plurality of elastic elements 32 having pawls 31 elastically engaging the teeth 30. The elastic ring 33 further defines fixing bosses 34 for press fitting into grooves 35 defined on an inside wall of the control ring 18, whereby the elastic ring 33 is retained in position and against rotation.

The elastic elements 32 perform at least three functions. One of them is application of an urging force to separate the above-mentioned pressure contact surfaces 28 and 29. The second function is to engage the locking ring 22 and cause it to rotate with the control ring 18 since, otherwise, the locking ring 22 would be freely rotatable when out of pressure contact with the chuck body 11. The third function is a locking function to fix the locking ring 22 which may become loose by reaction even when the locking ring 22 is pressed against the chuck body 11.

A cover 36 is mounted on the rear end of the control ring 18, and is press fit at a base thereof on a rear position of the chuck body 11.

The elastic ring 33 is fixed to the control ring 18 in this embodiment, but may be fixed to the chuck body 11.

The screw ring 15 consists of two parts which are rigidly interconnected by the press fitting the output ring 20 after the two parts are assembled to the chuck body 11. The interconnection may be achieved by any other means, such as by defining screws on the two elements for screwing tight together, or by a spline engagement therebetween with an E-ring provided for preventing separation.

In FIGS. 1 and 2, numeral 37 denotes a bearing provided in the input ring 21 for smooth rotation of the control ring 18.

The way in which the tool chuck 10 as constructed above operates will be described next.

Assume that the chuck jaws 12 are wide open to be ready to hold the tool A. The tool A is placed in position, and the control ring 18 is turned in the tightening direction for causing the chuck jaws 12 to clamp the tool A.

Since, in the initial stage of this ring turning operation, the chuck jaws 12 are free from the load resulting from the clamping of tool A, the locking ring 22 of the torque amplifying mechanism 17 is in a free state relative to the chuck body 11. Further, since the locking ring 22 is engaged by the elastic elements 32, the output ring 20, input ring 21 and locking ring 22 are interconnected as a unit and are rotated together. As a result, the rotation of the control ring 18 directly causes an equal-rate rotation of the screw ring 15, which provides a fast screw feed for projecting the chuck jaws 12.

A load acts on the chuck jaws 12 when the jaws 12 contact and begin to clamp the tool A. This load causes a backlash of the screw ring 15, which rearwardly pushes the locking ring 22 through the output ring 20 and input ring 21.

As a result, the pressure contact surfaces 28 and 29 of the locking ring 22 and chuck body 11 move into pressure contact with each other. The elastic elements 32 yield to this pressure contact, which results in slippage thereof. The locking ring 22 is then fixed to the chuck body 11, to place the torque amplifying mechanism 17 in an operable state.

Input ring 21 has holes 37 disposed as shown about the outer peripheral surface thereof into which are fitted balls. By such balls fitted in hole 37, the input ring 21 is rotatably fitted into the control ring 18. When control ring 18 is rotated and lock ring 22 is locked, input ring 21 is rotated along an eccentric path. When locking ring 22 is locked by frictional contact of its surface 28 with surface 29, slippage occurs in elastic ring 32. Then, control ring 18, via, the balls in holes 37, rotates eccentrically, input ring 21. The balls 25 in the wave shaped channels 23, 24, cause proportional recduction in rotation of the input ring 21 and then cause ball 26 to rotate output ring 22.

That is, the rotation of the control ring 18 causes revolution of the input ring 21, whereby the balls 25 roll along the rolling grooves 23 and 24 to rotate the input ring 21. The rotation of the input ring 21 is transmitted to the output ring 20 as a high torque resulting from reduction of the input, to rotate the screw ring 15 for projecting the chuck jaws 12 and causing them to clamp the tool A with the high torque.

In carrying out an operation with the tool A held by the chuck jaws 12 as described above, the tool A which may be a driver bit, for example, is turned in opposite directions depending on the nature of the operation.

If this operation involves forward rotation of the tool A which acts on the control ring 18, torque amplifying mechanism 17 and screw ring 15 in the direction to tighten the chuck jaws 12, then backward rotation acts on these components 18, 17 and 15 in the direction to relax the chuck jaws 12. Even though a reaction occurs with reversal of the roatation acting in the direction to relax the chuck jaws 12, actually no relaxation will occur because the locking ring 22 is engaged by the elastic elements 32 to rigidly connect the control ring 18, torque amplifying mechanism 17 and screw ring 15 to the chuck body 11.

When releasing the tool A, the control ring 18 needs only to be rotated in the relaxing direction.

Then the chuck jaws 12 are relaxed under a high torque since the torque amplifying mechanism 17 is in the operative state in the initial stage of rotation. When the chuck jaws 12 are further relaxed to eliminate the backlash of the screw ring 15, the elastic elements 32 push back the locking ring 22. Consequently, the pressure contact surfaces 28 and 29 of the locking ring 22 and chuck body 11 move out of the pressure contact. The screw ring 15 rotates fast at the same speed as the control ring 18, to move the chuck jaws 12 fast in the relaxing direction.

According to this embodiment, the tool A is held with the tightening force amplified by the torque amplifying mechanism 17. Thus the tool A is held rigidly in a manner equivalent to the case of using a chuck handle.

Further, the torque amplifying mechanism 17 includes the three rings, i.e. the output ring 20, input ring 21 and locking ring 22. This construction is compact and capable of easily interlocking with the chuck jaws 12. Despite the simple construction, a great torque can be transmitted.

The urging engagement provided by the elastic elements 32 is effective to prevent loosening of the control ring 18 and chuck jaws 12 against vibrations occurring during an operation. This promotes clamping of the tool A with increased rigidity.

Besides the function to prevent relaxation, the elastic elements 32 have the functions to engage the control ring 18 for rigid connection, to retain the control ring 18 on the chuck body 11, and to release the chuck body 11 and chuck jaws 12 from mutual pressure contact when removing the tool A from the chuck jaws 12. This single component fulfilling these functions enables the construction to be compact with a reduced number of components.

In the foregoing first embodiment, the output of input ring 21 is transmitted to the screw ring 15 through the output ring 20. Alternatively, the output may be made through a gear coupling operatively interconnecting the input ring 21 and screw ring 15 and capable of absorbing the eccentric rotation of the input ring 21.

Further, in the first embodiment, the chuck jaws 12 are fed by the action of screw ring 15 fitted peripherally thereof. The torque amplifying mechanism 17 is applicable to the type of chuck jaws which are pushed and pulled by a bush provided at the rear ends of the chuck jaws and driven by screw feeding.

Second Embodiment

Figure 4:
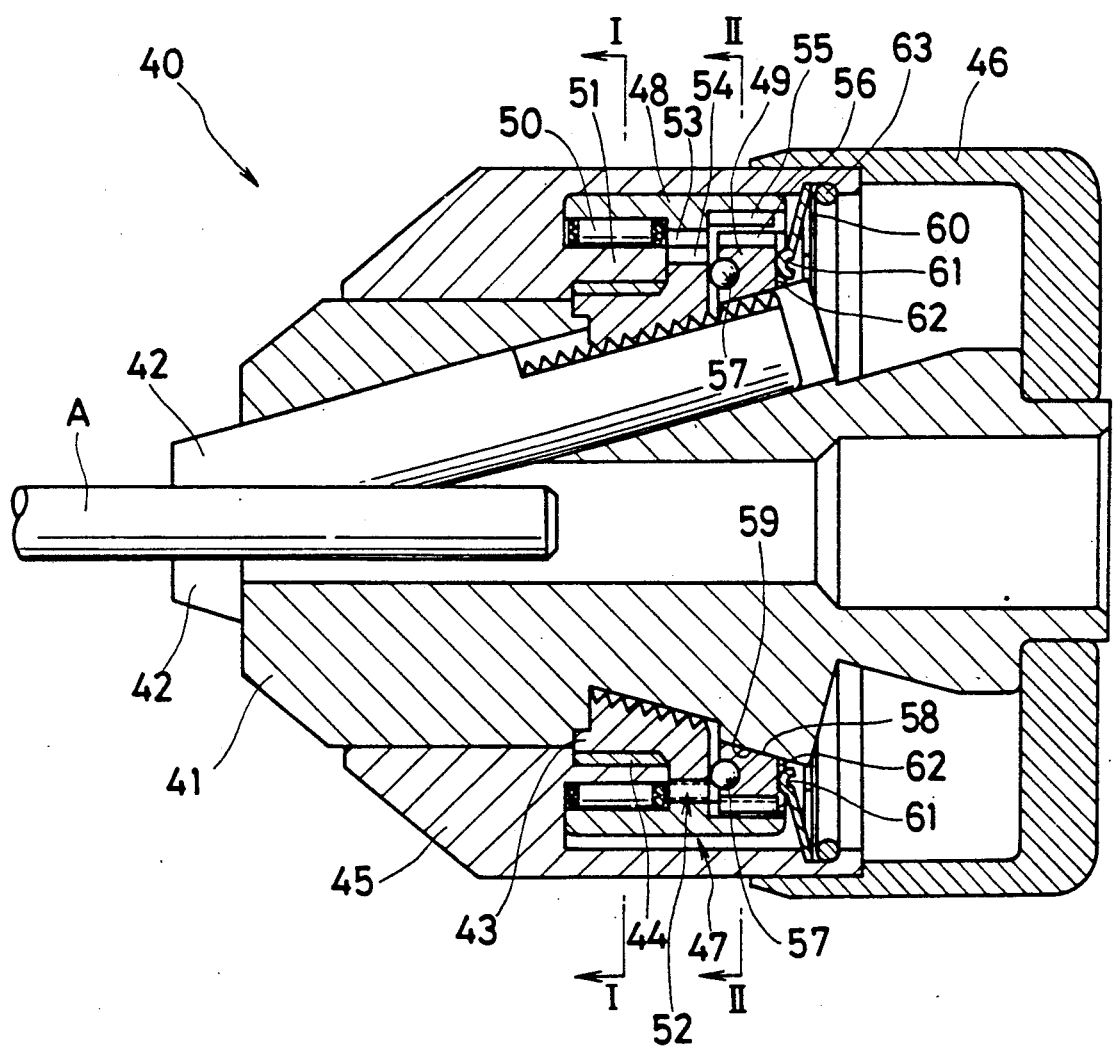
FIG. 4 is a view in vertical section of a tool chuck in a second embodiment.
Figure 5:
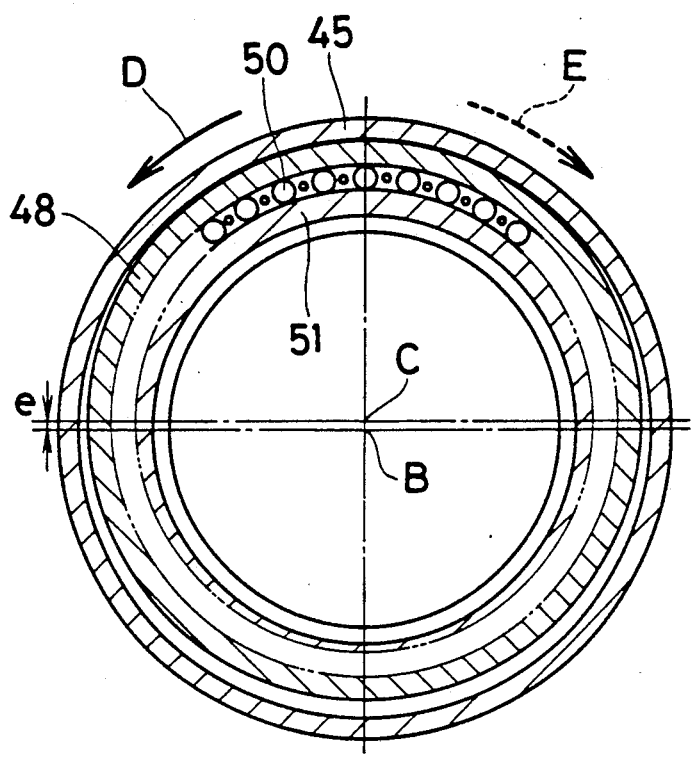
FIG. 5 is a section taken on line I—I of FIG. 4 and illustrating an operation.
Figure 6:
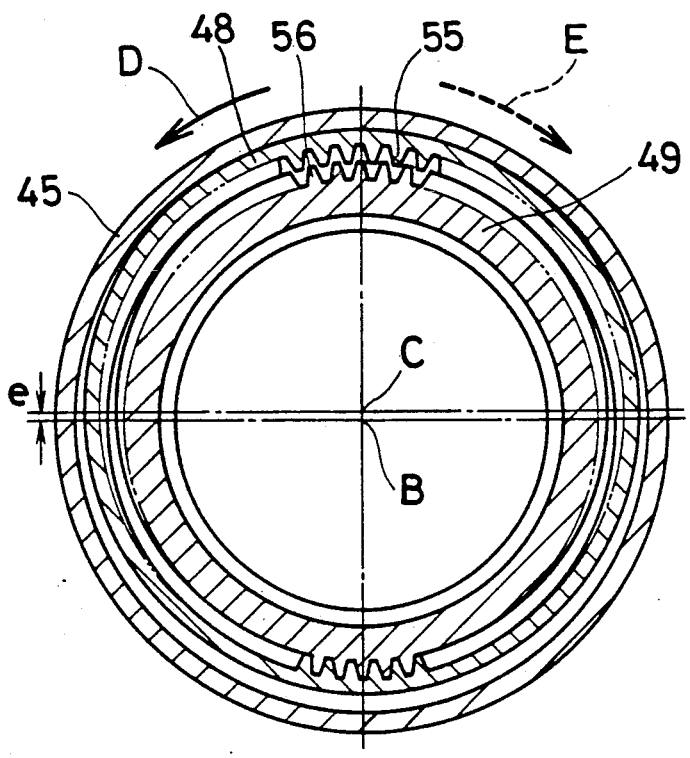
FIG. 6 is a section taken on line II—II of FIG. 4 and illustrating an operation.

FIGS. 4 through 6 show a tool chuck in a second embodiment. In FIG. 4, the tool chuck 40 comprises three chuck jaws 42 slidably mounted in a chuck body 41, to be projectable and retractable by opposite rotations of a screw ring (or nut) 43, as in the first embodiment shown in FIG. 1. A detailed description of such arrangement is omitted here.

The screw ring 43 consists of two parts which are rigidly interconnected by press-fitting a sleeve 44 peripherally thereof.

The chuck body 41 carries a cylindrical control ring 45 rotatably mounted on an intermediate peripheral position thereof. A cylindrical cover 46 is fitted and fixed to the periphery at a proximal end of the chuck body 41.

A torque amplifying mechanism 47 is provided in a power transmitting path between the screw ring 43 and control ring 45 for transmitting torque of the control ring 45 to the screw ring 43.

The torque amplifying mechanism 47 includes an input/output ring 48 rotatably fitted in the control ring 48, and a locking ring 49 rotatably mounted on the chuck body 41.

The input/output ring 48 has a forward inside wall fitted through a needle bearing 50 on the outer peripheral surface of a tubular control section 51 formed centrally of the control ring 45.

As also shown in FIG. 5, the outer peripheral surface of the tubular control section 51 is formed about an axis C which is offset an amount e with respect to an axis B of the chuck body 41.

The input/output ring 48 has an intermediate inside wall in driving engagement through a gear coupling 52 with an outer periphery of a rear end of the screw ring 43.

More particularly, this gear coupling 52 is loosely meshed with a gear 53 formed on the intermediate inside wall of the input/output ring 48, and with a gear 54 formed on the outer periphery at the rear end of the screw ring 43, to allow eccentricity in the amount e.

Further, the input/output ring 48 has a rear inside wall defining a gear 55 which, as also shown in FIG. 6, is meshed with a gear 56 formed peripherally of the locking ring 49.

These gears 55 and 56 form cycloidal gears for making a cycloidal motion. When the control ring 45 is turned to revolve the input/output ring 48 through the eccentricity of the tubular control section 51, a difference in the number of teeth between the gear 55 formed on the input/output ring 48 and the gear 56 formed on the locking ring 49 results in rotation of the input/output ring 48 corresponding to the extra number of teeth. As a result, the rotation of the input/output ring 48 is greatly reduced, and the rotation of the input/output ring 48 provides an amplified torque output.

Where, for example, the gear 56 of the locking ring 49 has 66 teeth and the gear 55 of the input/output ring 48 has 68, the difference in the number of teeth being 2, the reduction ratio is 2/66 teeth = 1/33. Thus, the reduction ratio of 1/33 is obtained with respect to an input, whereby the input/output ring 48 provides a greatly amplified torque output.

A suitable number of thrust balls are mounted for rolling movement between opposed surfaces of the screw ring 43 and locking ring 49.

The locking ring 49 has an inside peripheral wall defining a tapered pressure contact surface 58 diverging rearwardly, while the chuck body 41 has an intermediate outer peripheral wall defining a tapered pressure contact surface 59 opposed to the contact surface 58 and diverging rearwardly to correspond thereto.

These pressure contact surfaces 58 and 59 move into pressure contact with each other when the screw ring 43 is retracted by a backlash of the chuck jaws 42 resulting from tightening of the screw ring 43 for clamping the tool A, whereby the locking ring 49 is fixed to the chuck body 41.

An elastic ring 60 is fitted in a peripheral inside wall of the control ring 45 to be opposed to the rear end of the locking ring 49. The elastic ring 60 includes elastic elements 61 formed around inside peripheral positions thereof and engaging a toothed surface at the end of the locking ring 49. In this way, the control ring 45 and locking ring 49 are rigidly interconnected and the locking ring 49 and chuck body 41 are urged in a direction to separate the pressure contact surfaces 58 and 59.

A retainer ring 63 is fixed by press fit rearwardly of the elastic ring 60 to hold the elastic ring 60 in position and against rotation.

The way in which the tool chuck 40 as constructed according to the second embodiment is tightened and loosened will be described next.

When the tool A is clamped by the three chuck jaws 42, the control ring 45 is turned in a tightening direction D (indicated by solid line arrows in FIGS. 5 and 6) for clamping the tool A, with the cover 46 locked against rotation.

Since, in the initial stage of this turning operation, the chuck jaws 42 are free from the load resulting from the clamping of tool A, the locking ring 49 forming part of the torque amplifying mechanism 47 is rotatable relative to the chuck body 41. Further, since the locking ring 49 is connected to the control ring 45 by the elastic elements 61, the control ring 45, input/output ring 48 and locking ring 49 rotate together. As a result, the rotation of the control ring 45 directly causes an equal-rate rotation of the screw ring 43, which provides a fast screw feed for rapidly projecting the chuck jaws 42 to clamp the tool A.

Subsequently, a load acts on the chuck jaws 42 when the claws 42 contact and begin to clamp the tool A. Then the screw ring 43 is retracted by a backlash due to the tightening, which rearwardly pushes the locking ring 49 through the thrust balls 57. As a result, the pressure contact surfaces 58 and 59 of the locking ring 49 and chuck body 41 move into pressure contact with each other. The elastic elements 62 yield to this pressure contact, which results in slippage thereof. The locking ring 49 is then fixed to the chuck body 41, to place the torque amplifying mechanism 47 in an operable state to produce the speed reducing effect.

That is, the rotation of the control ring 45 causes the tubular control section 51 to revolve the input/output ring 48 the amount of eccentricity. This produces rotation of the input/output ring 48 based on the difference in the number of teeth between the gear 55 formed on the input/output ring 48 and the gear 56 formed on the locking ring 49. This rotation is output as a high torque resulting from reduction of the input, to rotate the screw ring 43 and screw-feed the chuck jaws 42, thereby causing them to clamp the tool A with the high torque.

In carrying out an operation with the tool A held by the chuck jaws 42 as described above, the elastic elements 61 engaging the locking ring 49 act to stop the relaxation resulting from rotation in the direction to relax the chuck jaws 42.

When releasing the tool A, the control ring 45 needs only to be rotated in the relaxing direction E (indicated by dotted arrows in FIGS. 5 and 6).

When the chuck jaws 42 are retracted to eliminate the backlash due to the tightening and acting on the screw ring 43, the locking ring 49 is advanced by the urging force of elastic elements 61. Consequently, the pressure contact surfaces 58 and 59 of the locking ring 49 and chuck body 41 move out of the pressure contact. Then the reduction effect of the torque amplifying mechanism 47 is canceled, whereby the control ring 45, input-/output ring 48 and locking ring 49 rotate together. The screw ring 43 rotates at the same speed as the control ring 45, to screw-feed the chuck jaws 42 fast in the relaxing direction. As a result, the chuck jaws 42 rapidly slide away from each other to release the tool A.

When the tool A is held, the torque undergoes the speed reduction and amplification by the torque amplifying mechanism 47 as described above. Thus, a higher torque is obtained than where the torque of the control ring 45 is transmitted directly to the screw ring 43 meshed with the respective chuck jaws 42. By simply turning the control ring 45 in the tightening direction, the tool A may be rigidly clamped and fixed in position.

Moreover, the control ring 45, input/output ring 48 and locking ring 49 may be rotated together in opposite directions during the turning operation carried out until the tool A is clamped in position and the turning operation after the release thereof. The chuck jaws 42 are rapidly screw-fed toward and away from one another by the screw ring 43 to clamp and release the tool A. Thus, this construction has excellent operability.

The following construction may be provided in place of the tubular control section 51 of the second embodiment.

The control ring 45 may have an inside peripheral wall offset the amount e with respect to the axis B of the chuck body 41, with the input/output ring 48 loosely fitted in this eccentric inside peripheral wall, the input-/output ring 48 being revolvable along the eccentric inside peripheral wall of the control ring 45.

Such a construction will be described next as a third embodiment, with emphasis placed on the torque amplifying mechanism.

Third Embodiment

Figure 7:
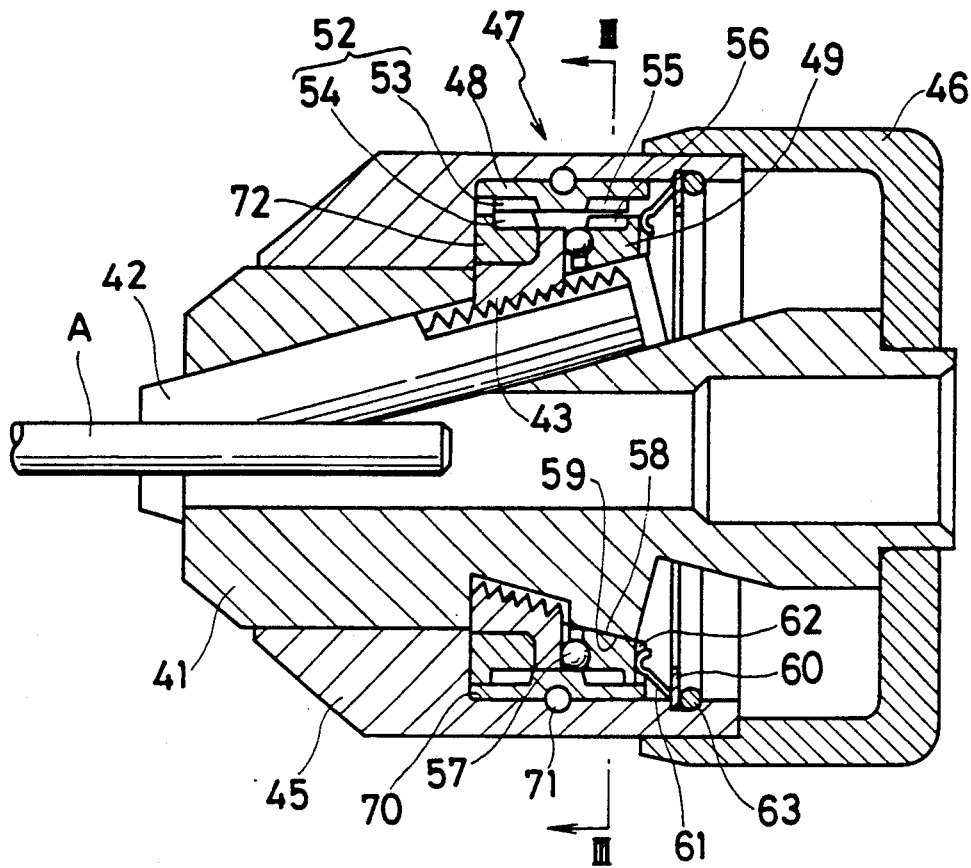
FIG. 7 is a view in vertical section of a tool chuck in a third embodiment.
Figure 8:
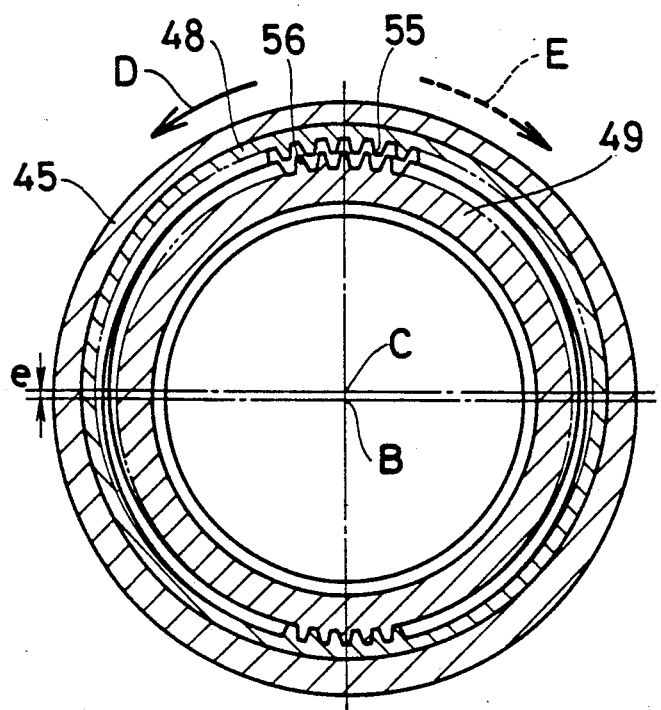
FIG. 8 is a section taken on line III—III of FIG. 7.

FIGS. 7 and 8 show a tool chuck in the third embodiment. This tool chuck has the same basic construction as in the second embodiment, and like components are affixed with like reference numerals without describing the particulars thereof.

The control ring 45 has an inside peripheral wall formed about an axis C which is offset an amount e with respect to the axis B of the chuck body 41. The input-/output ring 48 of the torque amplifying mechanism 47 is rotatably fitted in the concentric inside peripheral wall 70 of the control ring 48 through a plurality of balls 71. When the control ring 45 is turned, the input/output ring 48 is revolvable along this eccentric peripheral inside wall 70.

A sleeve 72 is press fitted peripherally of the screw ring 43. The gear coupling 52 comprises a gear 53 formed on an inside wall at the forward end of the input/output ring 48 and a gear 54 formed on the outer periphery of the sleeve 54.

Further, the input/output ring 48 has a rear inside wall defining a gear 55 which is meshed with a gear 56 formed peripherally of the locking ring 49. These gears 55 and 56 form cycloidal gears. The numbers of teeth of these gears 55 and 56 are selected as in the second embodiment.

When the control ring 45 is turned, the torque amplifying mechanism 47 causes the tool A to be clamped as in the second embodiment.

In the initial stage of this turning operation when the chuck jaws 42 are not clamping the tool A yet, the control ring 45, input/output ring 48 and locking ring 49 rotate together to rotate the screw ring 43 at the same speed as the control ring 45 as described in the second embodiment. The fast screw feed by the screw ring 43 causes the chuck jaws 42 to move toward one another rapidly to clamp the tool A.

Subsequently, a load acts on the screw ring 43 when the chuck jaws 42 contact and begin to clamp the tool A. Then the screw ring 43 is retracted by a backlash due to the tightening, which rearwardly pushes the locking ring 49 through the thrust balls 57. As a result, the pressure contact surfaces 58 and 59 of the locking ring 49 and chuck body 41 move into pressure contact with each other. The elastic elements 62 yield to this pressure contact, which results in slippage thereof. The locking ring 49 is then fixed to the chuck body 41, to place the torque amplifying mechanism 47 in an operable state to produce the speed reducing effect.

That is, the rotation of the control ring 45 causes the eccentric inside wall 70 to revolve the input/output ring 48 the amount of eccentricity. This produces rotation of the input/output ring 48 based on the difference in the number of teeth between the gear 55 formed on the input/output ring 48 and the gear 56 formed on the locking ring 49. This rotation is output as a high torque resulting from reduction of the input, to rotate the screw ring 43 through the gear coupling 52 and screwfeed the chuck jaws 42, thereby causing the chuck jaws 42 to clamp the tool A with the high torque.

When releasing the tool A, the control ring 45 needs only to be rotated in the relaxing direction E (indicated by the dotted arrow in FIG. 8), as already described in the second embodiment. A detailed description thereof will therefore be omitted.

Functions and advantages may be expected from the third embodiment as constructed above, which are equivalent to those of the second embodiment.

Fourth Embodiment

Figure 9:
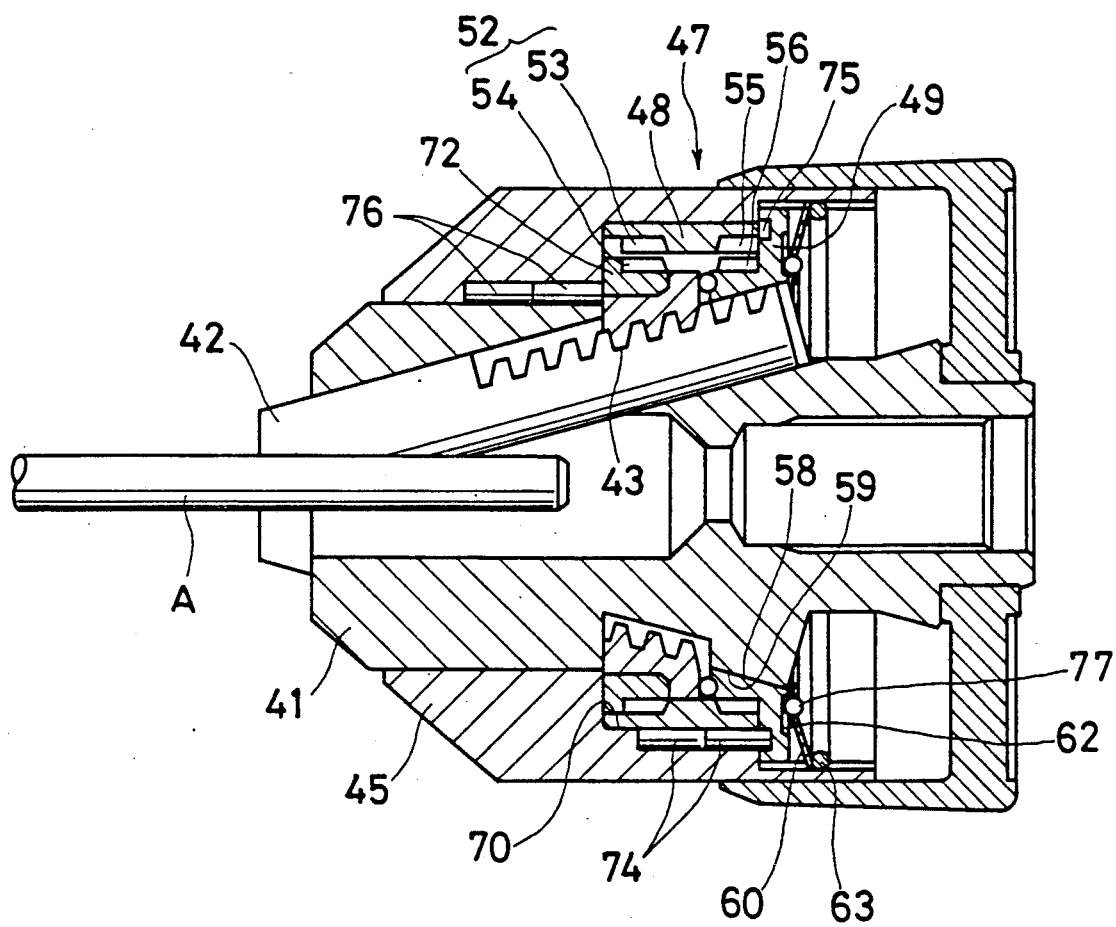
FIG. 9 is a view in vertical section of a tool chuck in a fourth embodiment.
Figure 10:
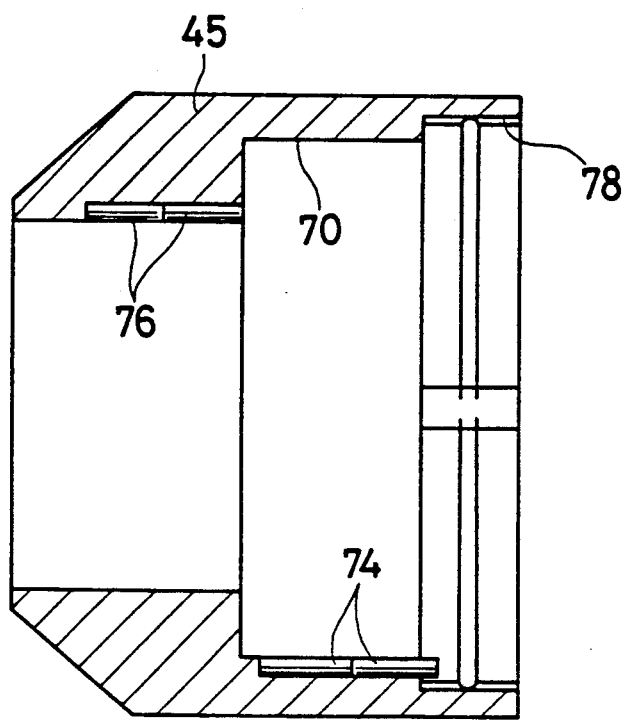
FIG. 10 is a view in vertical section of a control ring.
Figure 11:
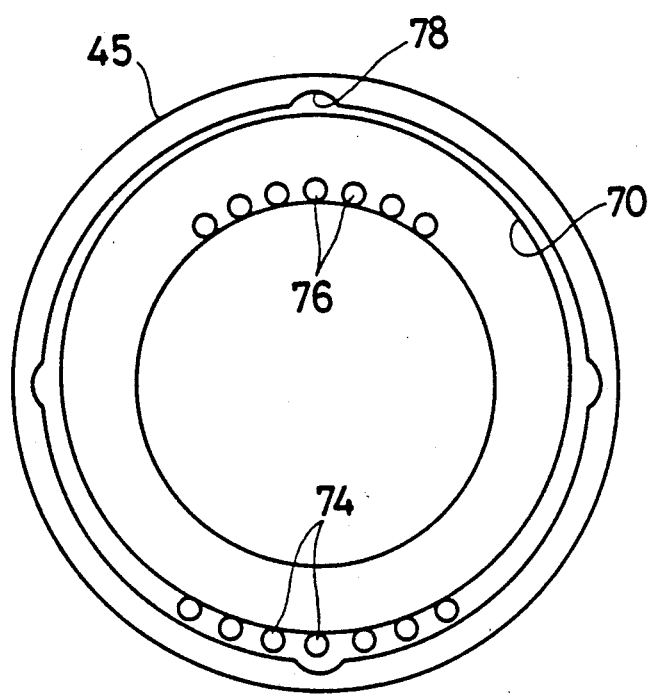
FIG. 11 is a side view of the control ring.

FIGS. 9, 10 and 11 show a tool chuck in a fourth embodiment. This fourth embodiment relates to another example of the bearing for the input/output ring 48 in the third embodiment. The torque amplifying mechanism 47 and other basic constructions are the same as in the third embodiment, and like components are affixed with like reference numerals without describing the particulars thereof.

As in the third embodiment, the control ring 45 has an inside peripheral wall offset with respect to the axis of the chuck body 41. The input/output ring 48 of the torque amplifying mechanism 47 is rotatably fitted in the concentric inside peripheral wall 70 of the control ring 48. When the control ring 45 is turned, the input/output ring 48 is revolvable along this eccentric peripheral inside wall 70.

The input/output ring 48 revolvable as above is supported by a plurality of needle bearings 74. These needle bearings 74 are arranged only along a partial circumferential range.

That is, the cycloidal gear 56 of the locking ring 49 revolves and rotates while partially engaging the cycloidal gear 55 of the input/output ring 48. This engagement takes place in a fixed range as far as the control ring 45 is concerned. The load produced by clamping of the tool A results in a radial pressure acting only in the above range of engagement.

Thus, the needle bearings 74 are provided along the partial circumferential range of the control ring 45 where the gears 55 and 56 engage each other and the load is applied.

The needle bearings 74 have ends slightly projecting toward the locking ring 49. The locking ring 49 defines a fitting groove 75 extending circumferentially thereof and opposed to the projecting portions of the needle bearings 74. This fitting groove 75 receives the projecting portions of the needle bearings 74 so as to allow movement due to the rotation (movement relative to the locking ring 49) of the needle bearings 74.

The load produced by the clamping of the tool A acts on the needle bearings 74 and radially presses the needle bearings 74 as noted above. Therefore, where the control ring 45 is formed of a synthetic resin, the pressing force will tend to partially expand and deform the control ring 45. Such outward deformation of the control ring 45 is suppressed since the ends of the needle bearings 74 are snugly fitted in the fitting groove 75 against outward spread under the pressure.

When the control ring 45 is outwardly expanded, this will fill the gap between its outer periphery and the cover 46, which is effective to prevent entry of dust and other foreign matter through the gap.

When the force is applied to radially spread the needle bearings 74 as noted above, this load is applied to the inward position of the control ring 45. As a result, an internal stress is produced in the control ring 45 to cause a twist with its outward portion.

To counteract the twist, needle bearings 76 are provided on an inside peripheral wall in the outward portion of the control ring 45 to be opposed to the needle bearings 74. These needle bearings 76 prevent the twist of the control ring 45.

The needle bearings 74 and 76 may be provided in a small number. With the projecting portions of the needle bearings 74 held in the fitting groove 76 of the locking ring 49, the deformation of the control ring 45 due to the tool clamping load may be avoided.

The bearing structure described above may be applied also to the tool chuck in the first embodiment shown in FIG. 1.

In FIG. 9, the elastic ring 60 comprises a spring material formed into an inclined flange shape and retaining a plurality of balls 77 at a plurality of positions thereof. These balls 77 engage and springload the toothed face 62 extending over the entire periphery of the locking ring 49.

The elastic ring 60 thus formed provides functions and advantages equivalent to those provided by the third embodiment.

In FIG. 11, recesses 78 serve to lock the elastic ring 60, and the latter defines projections (not shown) engageable with these recesses.

Fifth Embodiment

Figure 12:
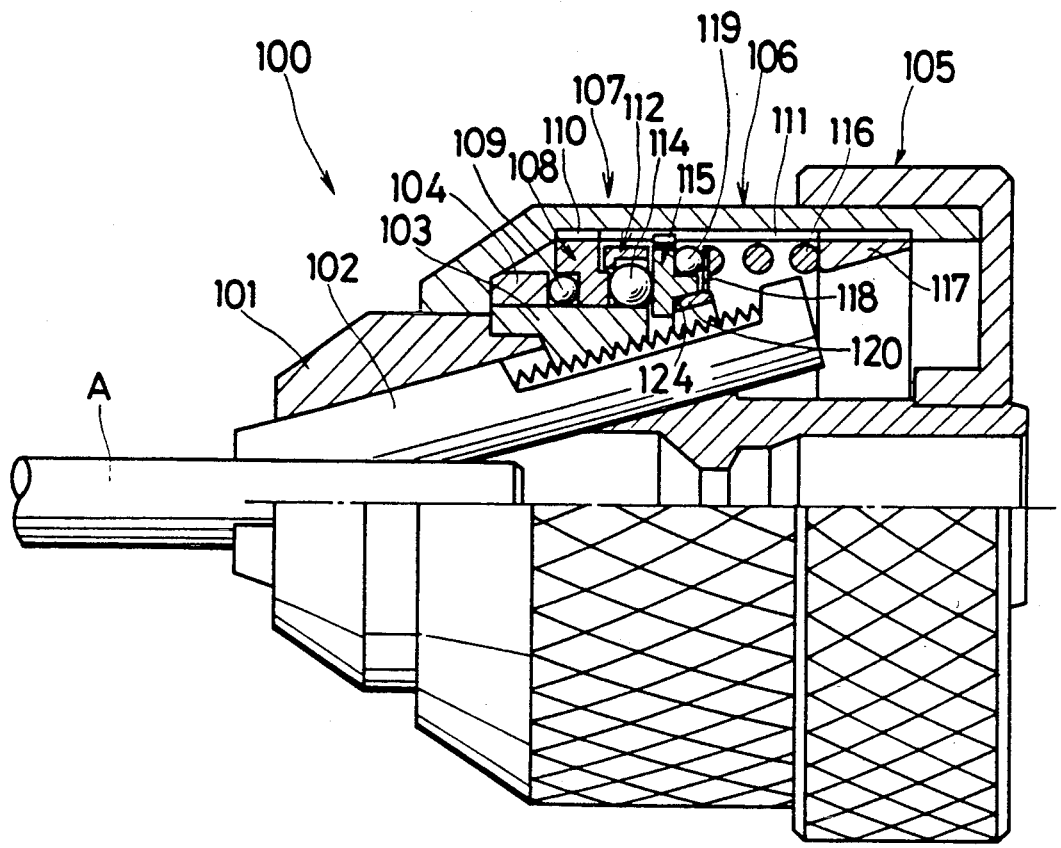
FIG. 12 is a view in vertical section of a tool chuck in a fifth embodiment.
Figure 13:
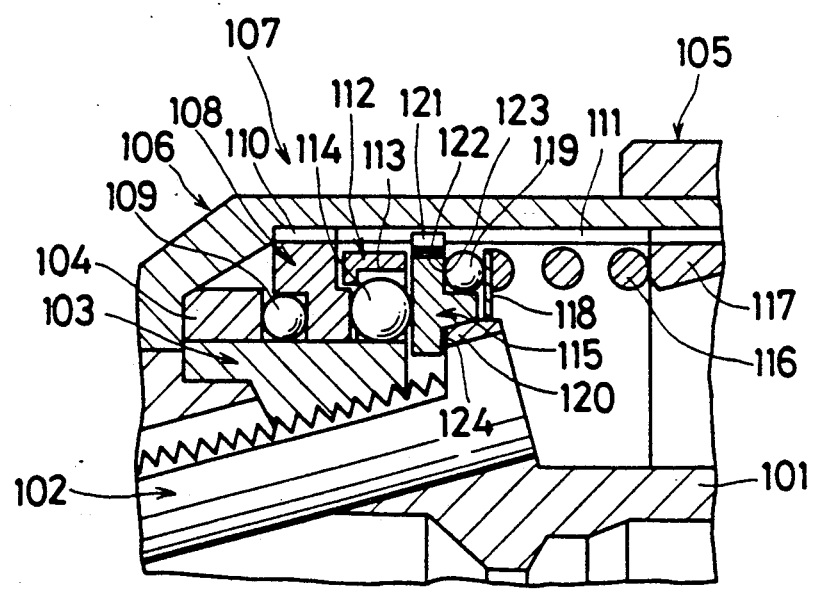
FIG. 13 is an enlarged partial view in vertical section of a torque amplifying mechanism in an inoperative position.
Figure 14:
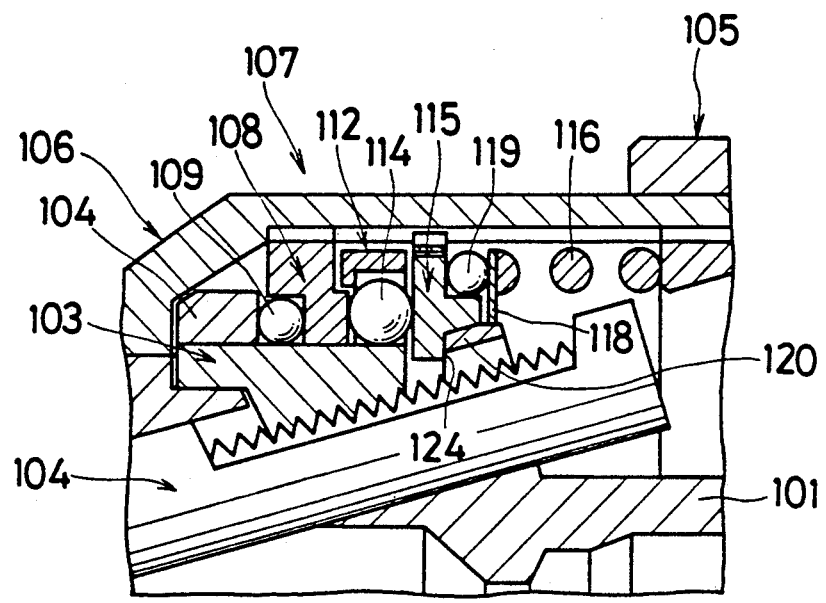
FIG. 14 is an enlarged partial view in vertical section of the torque amplifying mechanism in an operative position.

FIGS. 12, 13 and 14 show a tool chuck in a fifth embodiment. In FIG. 12, the tool chuck 100 comprises three chuck jaws 102 slidably mounted in a chuck body 101, to be projectable and retractable by opposite rotations of a screw ring (or nut) 103, as in the first embodiment shown in FIG. 1. A detailed description of such arrangement is omitted here.

The screw ring 103 consists of two parts which are rigidly interconnected by press-fitting a sleeve 104 peripherally thereof.

A cover 105 having a U-shaped section is fixed to the outer periphery of a proximal end of the chuck body 101. The chuck body 101 carries a cylindrical control ring 106 rotatably mounted on an intermediate peripheral position thereof. The control ring 106 has the outer periphery of an open end thereof relatively rotatably fitted in the inner periphery of the proximal end of the cover 105.

A torque amplifying mechanism 107 is provided between the control ring 106 and screw ring 103 for transmitting torque of the control ring 106 to the screw ring 103.

The torque amplifying mechanism 107 includes an input ring 108 interlocked with the control ring 106, an output retainer 112 fixed to the screw ring 103, and a locking ring 115.

The input ring 108 is rotatably mounted on an intermediate outer periphery of the screw ring 103. A plurality of metallic rolling balls 109 are arranged between opposed surfaces of the input ring 108 and sleeve 104. The input ring 108 includes a plurality of projections 110 on the outer periphery thereof for engagement with a plurality of grooves 111 defined in the inside wall of the control ring 106. In this way, the input ring 108 is interlocked with the control ring 106 to be capable of a slight axial movement.

The output retainer 112 is fixed to the outer periphery of a proximal portion of the screw ring 103. The output retainer 112 includes ball holders 113 provided at, for example, 16 equidistant positions peripherally thereof. Each ball holder 113 holds a metallic ball 114.

The locking ring 115 is rotatably supported between the output retainer 112 fixed to the screw ring 103, and a stepped portion defined on an intermediate periphery of the chuck body 101. The locking ring 115 is constantly urged for pressure contact with the balls 114 of the output retainer 112 fixed to the screw ring 103, by a coil spring 116 housed in the proximal portion of the cover 105.

The coil spring 116 is compressed between a spring stopper 117 fixed to the inside wall of the proximal portion of the cover 105 and a presser plate 118. A plurality of metallic balls 119 are arranged between opposed surfaces of the locking ring 115 and pressure plate 118.

Thus, the coil spring 116 constantly presses the presser plate 118, balls 119, locking ring 115, the balls 114 held by the output retainer 112, input ring 108, balls 109, sleeve 104 and screw ring 103 axially against a peripheral inside wall at a forward end of the control ring 106.

As shown in FIG. 13, a leaf spring 121 is fixed to the inside wall of the control ring 106 and opposed to the outer periphery of the locking ring 115. When the locking ring 115 is permitted to rotate in opposite directions, a projection 122 formed on the leaf spring 121 engages a toothed surface 123 formed on the outer periphery of the locking ring 115 to rotate the locking ring 115 in the same direction as the control ring 106. When the locking ring 115 is locked against rotation, this engagement is broken to allow rotation of the control ring 106 only.

The engaging arrangement between the projection 122 of leaf spring 121 and the toothed surface 123 is equivalent and performs a similar function to the arrangement between the toothed surface 30 and elastic elements 32 in the first embodiment shown in FIG. 3. However, the leaf spring 121 does not act to separate the locking ring 115 from the stepped portion 120, and the fifth embodiment relies for this function on the coil spring 116.

The locking ring 115 includes a pressure contact surface 124 on an inside periphery thereof for pressure contact with the stepped portion 120. This pressure contact surface 124 may have a tapered shape.

The way in which the tool chuck 100 as constructed according to the fifth embodiment operates to clamp the tool A will be described next.

First, the tool A is inserted into the chuck body 101 through the chuck jaws 102 kept wide open. Then the control ring 106 is turned in a tool clamping direction relative to the chuck body 101.

During the turning operation before the chuck claws 102 move into contact with the tool A, only a minor resistance is applied to the screw ring 103, and the locking ring 115 of the torque amplifying mechanism 107 is in a free state relative to the chuck body 101. Further, since the locking ring 115 is connected to the control ring 106 by the leaf spring 121, the control ring 106, input ring 108, balls 114 of the output retainer 112, and locking ring 115 rotate together. The rotation of the screw ring 103 which is at the same speed as the control ring 106 provides a fast screw feed for rapidly projecting the chuck claws 102 to clamp the tool A.

Subsequently, as shown in FIG. 14, a load acts on the chuck jaws 102 when the claws 102 contact and begin to clamp the tool A, thereby producing a backlash of the chuck jaws 102. Then the screw ring 103 is axially retracted by the backlash, which axially retracts, through the sleeve 104 and balls 109, the input ring 108, balls 114 held by the output retainer 112, and locking ring 115 of the torque amplifying mechanism 107 which have been axially pressed. As a result, the pressure contact surface 124 of the locking ring 115 moves into pressure contact with the stepped portion 120 of the chuck body 101, and the leaf spring 121 for locking the locking ring 115 against rotation undergoes slippage.

When the locking ring 115 is locked against rotation, the balls 114 of the output retainer 112 act as idlers to roll, with the rotation of the input ring 108, along the opposed face of the locking ring 115. This rolling movement provides a reduced rotation of the output retainer 112, which reduces the rotation of the control ring 106 to rotate the screw ring 103 with high torque, thereby causing the chuck jaws 102 to firmly clamp the tool A.

In carrying out an operation with the tool A, the leaf spring 121 providing the locking engagement acts to stop relaxation due to reactions of opposite rotations of the tool chuck 100, which is the same as in the preceding embodiments.

When releasing the tool A, the control ring 106 is turned in the relaxing direction relative to the chuck body 101. In the initial stage of the turning operation, a momentary high torque occurs since the locking ring 115 of the torque amplifying mechanism 107 is locked against rotation. This facilitates rotation of the screw ring 103 in the relaxing direction.

Once relaxed, the resistance to the rotation diminishes, and the coil spring 116 releases the locking ring 115 from the pressure contact, with the locking ring 115 connected to the control ring 106 through the leaf spring 121. Then, the control ring 106 and torque amplifying mechanism 107 rotate together. The rotation of the control ring 106 causes the screw ring 103 to rotate at the same speed, whereby the chuck jaws 102 rapidly slide away from each other to release the tool A.

When the tool A is held, as described above, the rotation of the control ring 106 is reduced by the rotating balls 114 forming part of the torque amplifying mechanism 107, for transmission to the output retainer 112. Thus, a higher torque is obtained than the torque for rotating the control ring 106, for the tool A to be clamped firmly.

Moreover, the resistance of the load is small, and the control ring 106 and the respective components of the torque amplifying mechanism 107 can rotate together in opposite directions by the action of leaf spring 121 during the turning operation carried out until the tool A is clamped in position and the turning operation after the release thereof. The chuck jaws 102 are rapidly screw-fed toward and away from one another by the screw ring 103 to clamp and release the tool A. Thus, this construction has excellent operability.

For facility of operation, the relative rotation between the chuck body 101 and control ring 106 may be effected by opposite rotations of the power drill or power driver to which the chuck body 101 is attached.

This applies to the other embodiments as well.

In the fifth embodiment, the torque amplifying mechanism 107 includes the balls 114 rotatable to cause reduced rotation of the output retainer 112. These balls 114 may be replaced by gears.

Such a construction will be described as a sixth embodiment next.

Sixth Embodiment

Figure 15:
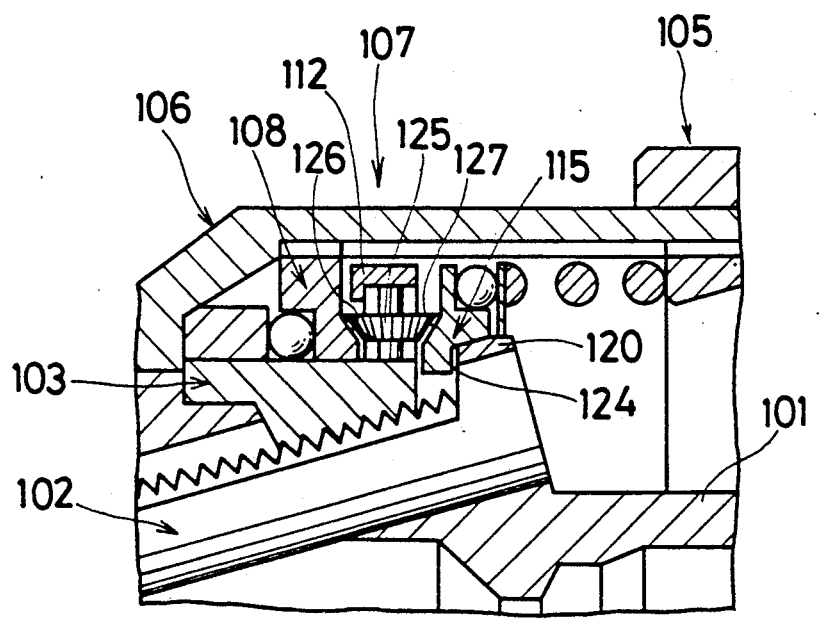
FIG. 15 is an enlarged partial view in vertical section of a tool chuck in a six embodiment.

FIG. 15 shows a tool chuck in the sixth embodiment. This tool chuck has the same basic construction as in the fifth embodiment, and like components are affixed with like reference numerals without describing the particulars thereof.

As illustrated, the torque amplifying mechanism 107 includes a plurality of bevel gears 125 provided between the screw ring 103 and output retainer 112 fixed thereto. The bevel gears 125 are meshed with a gear surface 126 formed on the input ring 108 and a gear surface 127 formed on the locking ring 115, respectively.

With this construction, when the locking ring 115 is locked against rotation by the pressure contact with the stepped portion 120, rotation of the input ring 108 causes rotation and rolling movement of the bevel gears 125. The rotation of the control ring 106 is reduced by this rolling movement for transmission to the output retainer 112. Thus, the bevel gears 114 perform a function equivalent to that of the balls 114 in the fifth embodiment, and this construction provides a high torque as in the fourth embodiment.

What is claimed is:
1. A tool chuck comprising
a chuck body,
a plurality of chuck jaws mounted centrally of of a forward end of said chuck body to be slidable toward and away from one another,
a screw ring,
a control ring mounted peripherally of the chuck body to be rotatable in opposite directions to rotate said screw ring for screw-feeding the chuck jaws toward and away from one another,
lock means disposed between said chuck body and said chuck jaws for pressing and locking to said chuck body by a reaction force occuring when said chuck jaws clamp a tool, and releasable upon removal of the reaction force and
torque amplifying means disposed between said lock means and said control ring for reducing rotation of said control ring to output an amplified torque to said screw ring when said lock means is locked to said chuck body, and transmitting rotation of said control ring to said screw ring when said lock means is released from said chuck body.

2. A tool chuck as claimed in claim 1, wherein said torque amplifying means includes an input ring loosely mounted eccentrically in said control ring and interlocked with said screw ring, said input ring and said lock means lockable to said chuck body being arranged axially of said chuck body, said input ring and said lock means having mutually opposed surfaces defining cycloidal rolling grooves having different numbers of waves, and balls mounted between said rolling grooves.

3. A tool chuck as claimed in claim 1, wherein said torque amplifying means includes an output ring fixed to said screw ring, and an input ring relatively rotatably and eccentrically supported in said control ring, said output ring, said input ring and said lock means being arranged axially of said chuck body, said input ring and said lock means having mutually opposed surfaces defining cycloidal rolling grooves having different numbers of waves, balls mounted between said rolling grooves, and power transmitting balls mounted between said input ring and said output ring.

4. A tool chuck as claimed in claim 1, wherein said torque amplifying means includes an input/output ring loosely mounted eccentrically in said control ring and interlocked with said screw ring, said input/output ring and said lock means lockable to said chuck body having opposed inner and outer faces defining cycloidal gears having different numbers of teeth and meshed with each other.

5. A tool chuck as claimed in claim 4, wherein said control ring includes a tubular control section formed on an intermediate inside wall thereof eccentrically with respect to an axis of said chuck body for rotatably supporting said input/output ring through a bearing provided peripherally of said tubular control section.

6. A tool chuck as claimed in claim 4, wherein said control ring includes an inside wall formed eccentrically with respect to an axis of said chuck body for rotatably supporting said input/output ring.

7. A tool chuck as claimed in claim 1, wherein said torque amplifying means includes an input ring fixed to said control ring, an output retainer disposed between said input ring and said lock means lockable to said chuck body and fixed to said screw ring, said input ring and said output retainer being arranged axially of said chuck body, and rotatable means held by said output retainer to be rotatable with a relative movement between said input ring and said lock means.

8. A tool chuck as claimed in claim 7, wherein said rotatable means comprises rollers.

9. A tool chuck as claimed in claim 7, wherein said rotatable means comprises bevel gears, said input ring and said lock means defining toothed surfaces for engagement with said bevel gears.

10. A tool chuck as claimed in any one of claims 1 to 4, 7 and 9, wherein said lock means comprises pressure contact surfaces defined on a locking ring and said chuck body to be opposed to each other.

11. A tool chuck as claimed in any one of claims 1 to 4, 7 and 9, wherein said lock means comprises tapered pressure contact surfaces defined on a locking ring and said chuck body to be opposed to each other.

12. A tool chuck as claimed in any one of claims 1 to 4, wherein said locking ring defines a toothed surface circumferentially of a rear end face thereof, said toothed surface being in engagement with an elastic element secured to said control ring.

* * * * *